US008055017B2

(12) United States Patent
Saito et al.

(10) Patent No.: US 8,055,017 B2
(45) Date of Patent: Nov. 8, 2011

(54) HEADLAMP MONITORING APPARATUS FOR IMAGE EXPOSURE ADJUSTMENT

(75) Inventors: Toru Saito, Tokyo (JP); Tsutomu Tanzawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 905 days.

(21) Appl. No.: 12/022,643

(22) Filed: Jan. 30, 2008

(65) Prior Publication Data

US 2008/0181461 A1 Jul. 31, 2008

(30) Foreign Application Priority Data

Jan. 31, 2007 (JP) .................. 2007-020752

(51) Int. Cl.
*G06K 9/00* (2006.01)
*H04N 7/18* (2006.01)

(52) U.S. Cl. .................. 382/103; 382/107; 348/148
(58) Field of Classification Search .................. 382/103
See application file for complete search history.

(56) References Cited

U.S. PATENT DOCUMENTS

| 5,410,346 A * | 4/1995 | Saneyoshi et al. ............ 348/116 |
| RE37,610 E * | 3/2002 | Tsuchiya et al. .............. 340/435 |
| 6,498,620 B2 * | 12/2002 | Schofield et al. ............. 348/148 |
| 6,731,777 B1 * | 5/2004 | Nishigaki et al. ............. 382/106 |
| 6,891,563 B2 * | 5/2005 | Schofield et al. ............. 348/148 |
| 2008/0180528 A1 * | 7/2008 | Saito ............................ 348/148 |

FOREIGN PATENT DOCUMENTS

| JP | 5-11499 | 5/1993 |
| JP | 5-265547 | 10/1993 |
| JP | 06-26628 | 9/1994 |
| JP | 10-283461 | 10/1998 |
| JP | 10-283477 | 10/1998 |
| JP | 2006-072495 | 3/2006 |

\* cited by examiner

*Primary Examiner* — David Zarka
(74) *Attorney, Agent, or Firm* — Smith, Gambrell & Russell, LLP

(57) ABSTRACT

There is provided a monitoring system including an image capture module for capturing an image, an object detecting unit for detecting an object from the image, a monitoring range setting unit for setting a monitoring range in a side of the object on the image, a determining unit for determining the existence of a light source within the monitoring range, and an adjusting unit for adjusting one of an exposure amount of the image capture and a luminance of a pixel output from the image capture when the determining unit determines the existence of the light source.

8 Claims, 15 Drawing Sheets

100# HEADLAMP MONITORING APPARATUS FOR IMAGE EXPOSURE ADJUSTMENT

CROSS-REFERENCE TO RELATED APPLICATIONS

The disclosure of Japanese Patent Application No. 2007-020752 filed on Jan. 31, 2007 including the specification, drawings and abstract is incorporated herein by reference in its entirety.

BACKGROUND OF INVENTION

1. Field of the Invention

The present invention relates to a monitoring system and more particularly to a monitoring system which can be mounted on a vehicle and can adjust an exposure amount of a camera which captures an image of surroundings of a subject vehicle.

2. Description of the Related Art

In recent years, a development of technologies has been in progress in which a three-dimensional object existing on a periphery of a vehicle such as a passenger vehicle is detected by analyzing an image captured by a CCD (Charge Coupled Device) camera (refer, for example, JP-A-07-225892). These technologies are applied, for example, to technologies for safety driving of vehicles in which a possibility of collision of the vehicle with the detected three-dimensional object is judged, so as to activate an audible warning system to give an alarm to a driver or activate an automatic steering or automatic brake control to avoid the possible collision.

In the detection of the three-dimensional object, it is important to accurately detect a preceding vehicle, tail lamps thereof, an oncoming vehicle, a pedestrian walking on the road and other obstacles such as vehicles parked along the side of the road. In addition, an exposure of the camera has to be appropriately implemented so as to capture an image which allows an accurate detection of the three-dimensional objects in order to detect these three-dimensional objects on the road from an image captured by the camera.

Cameras such as the CCD camera normally have a function to automatically implement the appropriate exposure adjustment. In addition, a system for adjusting the exposure of a camera has been proposed to cope with a case where an image capturing range of the camera is darkened or a brightness in the image capturing range largely changes, which the vehicle is driven during night-time or through a tunnel, or which the vehicle enters and exits from the tunnel (refer, for example, JP-A-07-081459 and JP-A-2005-148308).

Incidentally, according to functions that the CCD camera normally possesses and functions of the systems disclosed in JP-A-07-081459 and JP-A-2005-148308, the appropriate exposure adjustment is implemented for the brightness in the image capturing range of the camera or in an area set within an image captured by the camera. For example, an automatic control is performed on a subject which is following a preceding vehicle based on information available as a result of detecting the preceding vehicle by a camera. Then, light from a headlamp of an oncoming vehicle enters the camera of the subject vehicle where the oncoming vehicle comes to appear on a right-hand side (or a left-hand side in the United States of America and the like) of the preceding vehicle when driving at night or while driving through a tunnel.

As this occurs, even though the exposure of the camera is performed as above, the light of the headlamp of the oncoming vehicle brightly and widely expands on an image captured by the camera to thereby interrupt the capture of the right-hand side of the preceding vehicle by the camera, whereby there may be caused an occasion where the preceding vehicle is not be detected or a large detection error is caused to appear the oncoming vehicle. In addition, although there is a case where the preceding vehicle is detected based on positional information on tail lamps of the preceding vehicle, as is shown in FIG. 12, which will be described later, the light of the tail lamp of the preceding vehicle and the light of the headlamp of the oncoming vehicle are captured as an integral highly bright area. As a result, there is a risk that the tail lamp of the preceding vehicle is unable to be captured accurately.

Furthermore, according to a system disclosed in JP-A-07-225892, two cameras are used to capture an image of surroundings in front of a subject vehicle in a stereoscopic fashion to calculate a distance to a three-dimensional object existing on a periphery of the front of the subject vehicle by stereo matching to thereby detect the three-dimensional object. As is indicated by a shaded portion in FIG. 14, although the right-hand side camera is able to capture of the subject vehicle MC in the system, there is produced a range which lies invisible to the left-hand side camera due to the visibility of the range from the left-hand side camera being interrupted by the preceding vehicle.

Then, when an oncoming vehicle Vonc exists in the range, as is shown in FIG. 15, light Lhead of a headlamp of the oncoming vehicle Vonc is captured by the right-hand side camera but is not captured by the left-hand side camera. Due to this, the luminance of an image captured by the right-hand side camera becomes higher as a whole around the light Lhead of the headlamp than that of an image captured by the left-hand side camera, resulting in a case where stereo matching may not be able to be implemented accurately which is implemented based on the correlation between the luminances of the two captured images.

In addition, when attempting to implement stereo matching based on the two captured images, there may occur an occasion where stereo matching cannot be implemented accurately due to the influence of the light Lhead of the headlamp of the oncoming vehicle Vonc in a right-hand side portion of the preceding vehicle Vah or in the position of the right-hand side tail lamp of the preceding vehicle Vah, whereby a large detection error has to be generated in a distance from the subject vehicle MC to the preceding vehicle Vah which is detected based on the stereo matching.

SUMMARY OF INVENTION

One or more embodiments of the invention provide a monitoring system which implement an appropriate adjustment of exposure of an image capture when a light source such as a headlamp of an oncoming vehicle which emits intense light is captured in an image captured by the image capture, which reduce or eliminate an influence of the intense light.

According to a first aspect of the invention, a monitoring system is provided with an image capture unit or "image capture" for capturing an image of surroundings of a subject vehicle, an object detecting unit for detecting an object from a captured image, a monitoring range setting unit for setting a monitoring range in a side of the object based on an edge portion of the object, a determining unit for determining an existence of a light source within the monitoring range, and an adjusting unit for adjusting at least one of an exposure of the image capture and a luminance of a pixel output from the image capture when the determiner determines that the light source exists, a transverse width of the object is detected and updated when the determiner determines that the light source does not exist, and when the determining unit determines that the light source exists, the monitoring range setting unit sets the monitoring range based on a edge position on an opposite side of the object to a side thereof where the light source exists and the transverse width of the object which is stored.

According to a second aspect of the invention, the determining unit may determine that the light source exists when detecting a predetermined number or more of pixels whose luminance exceeds a predetermined threshold value in the monitoring range.

According to a third aspect of the invention, the determining unit may determine that the light source exists when detecting pixels whose luminance exceeds first predetermined threshold value in the monitoring range, calculating the number of pixels in a pixel area where adjacent pixels of the pixels so detected are gathered and determining that the calculated number of pixels exceeds second predetermined threshold value.

According to a fourth aspect of the invention, when the existence of the light source is determined, the adjusting unit may adjust step by step at least one of the exposure amount of the image capture and the luminance of the pixel output from the image capture until it is determined that the light source does not exist in sampling cycles thereafter or until an amount of adjustment reaches a preset limit amount.

According to a fifth aspect of the invention, the vehicle outside monitoring system may include a distance detector for calculating a distance in an actual space from the image to the object detected by the object detecting unit, when the existence of the light source is determined, the distance detector may calculate the distance based on positional information of the object which excludes positional information of the object on the side where the light source exists.

According to a sixth aspect of the invention, the object detecting unit may detect a transverse traveling speed of the object based on a position change of the object in the actual space within a sampling cycle, when the existence of the light source is determined, the object detecting unit may detect the transverse traveling speed based on the positional information of the object which excludes the positional information of the object on the side of the object where the light source exists.

According to the first aspect of the invention, the monitoring range for a light source is provided in an appropriate position to the side of the object which is captured as having the light source which emits intensive light. Thus, when there exists such a light source, it is possible to reduce or eliminate the influence of the light source accurately by adjusting the amount of exposure of the image capture or the luminance of a pixel which is emitted from the image capture.

In addition, the existence of a light source can be monitored in an ensured fashion by determining the existence of a light source by counting the number of pixels having high luminance in the monitoring range, detecting a transverse width of the object for update while there exists no light source within the monitoring range, and when determining that a light source exists within the monitoring range, setting the monitoring range in the position which lies apart by a distance equal to the transverse width from the edge portion of the object which lies on the opposite side to the side where the light source exists so as to set the monitoring range in the appropriate position.

According to the second aspect of the invention, by determining that a light source exists when the predetermined number or more of pixels having high luminance are detected in the monitoring range, it is possible to determine easily and clearly whether or not a light source exists within the monitoring range.

According to the third aspect of the invention, by detecting pixels having high luminance within the monitoring range, gathering the adjacent pixels having high luminance into the pixel area and calculating the number of pixels in the pixel area, and determining that a light source exists when the number of pixels so calculated is equal to or more than a predetermined number to thereby specify the pixels having high luminance in the monitoring range as pixels which have captured the light source so as to enable the determination of existence of the light source. Therefore, the existence of the light source can easily be determined in an ensured fashion.

According to the fourth aspect of the invention, by adjusting gradually and step by step the level of exposure adjustment which is implemented forcibly by the vehicle outside monitoring system separately from and in addition to the exposure adjustment function possessed by the image capture, it is possible to avoid a risk that other portions than light sources such as the tail lamps of the preceding vehicle and the headlamp of the oncoming vehicle cannot be discriminated by increasing drastically the level of the forced exposure adjustment. Since the object itself cannot be detected, it is possible to implement the forced exposure adjustment accurately.

Due to this, the detection of the tail lamps of the preceding vehicle and stereo matching on the reference image and the comparison image can be implemented accurately to detect the object and the light source accurately as described above.

According to the fifth aspect of the invention, by calculating the distance to the object based on the positional information of the object which excludes the positional information of the object on the side where the light source exists, the distance to the object can be calculated accurately without being affected by the light source. Therefore, it is possible not only to implement the forced exposure adjustment accurately but also to enhance reliability on the detection of the distance to the object, as well as the object and the light source based on the distance so detected.

According to the sixth aspect of the invention, the transverse traveling speed of the object can accurately be calculated without being affected by the light source by calculating the transverse traveling speed based on the positional information of the object which excludes the positional information of the object on the side where the light source exists.

Other aspects and advantages of the invention will be apparent from the following description and the appended claims.

DESCRIPTION OF THE PREFERRED EMBODIMENTS

Figure 1:
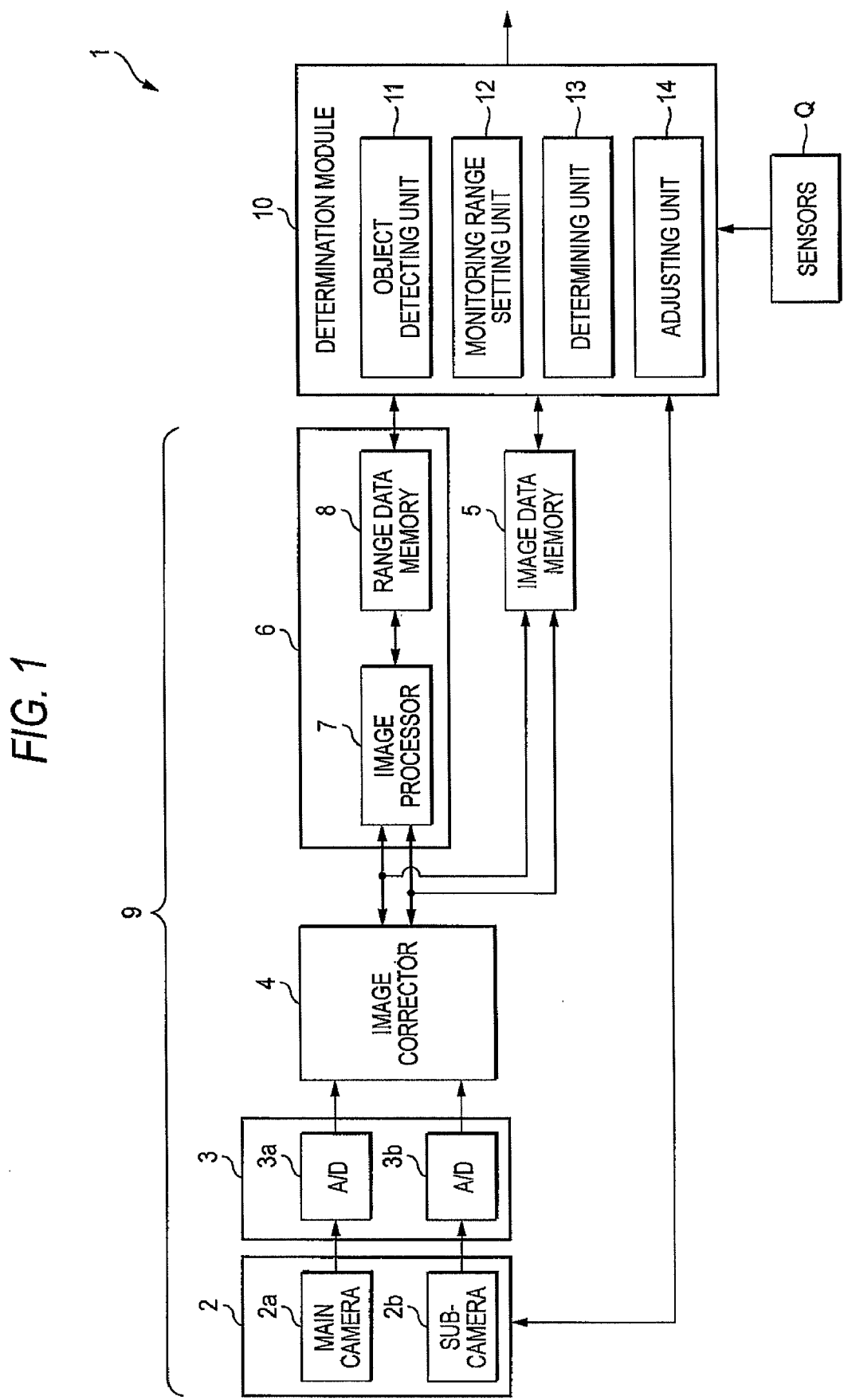
FIG. 1 is a block diagram showing the configuration of a vehicle outside monitoring system according to an embodiment of the invention.

As a preferred embodiment, in which a monitoring system is applied to a vehicle shown in FIG. 1, a vehicle outside monitoring system 1, according to the embodiment is configured by mainly including a positional information collecting unit 9 which is made up of an image capture module 2, a conversion module 3, an image processing module 6 and the like and a computer 10 including an object detecting unit 11 and the like.

Note that the positional information collecting unit 9 is disclosed in detail in published documents of the Japanese unexamined patent applications that had been filed by the applicant of this patent application which include JP-A-5-114099, JP-A-5-265547, JP-A-6-266828, JP-A-10-283461, JP-A-10-283477, and JP-A-2006-72495, and therefore, the published documents raised above should be referred to for detail description of the positional information collecting unit 9. The unit will briefly be described here below.

The image capture module 2 is a stereo camera made up of a pair of a main camera 2a and a sub-camera 2b which are synchronized with each other, which each incorporate an image sensor such as a CCD or a CMOS sensor and which are mounted, for example, in the vicinity of an inside rearview mirror in such a manner as to be spaced apart in a transverse direction of a subject vehicle, and is configured to capture at a predetermined sampling cycle an image of a landscape surrounding the front of the subject vehicle which includes the road ahead thereof so as to output a pair of images.

The two CCD cameras are provided as the image capture module 2, and as a function which is normally equipped on the CCD camera, an exposure adjustment is implemented automatically in order to obtain an optimum exposure. Here, the exposure adjustment includes at least shutter time adjustment, amplifier gain switching, and selection from an LUT (Look Up Table) for conversion of luminance, and these are adjusted generally.

In addition, although nothing has been mentioned about the adjustment of an iris diaphragm because the CCD camera used in this embodiment has no iris, in the event that the image capture module 2 has another function such as an iris for implementing exposure adjustment, the additional exposure adjustment component is included in the general implementation of the automatic exposure adjustment for obtaining an optimum exposure.

Figure 2:
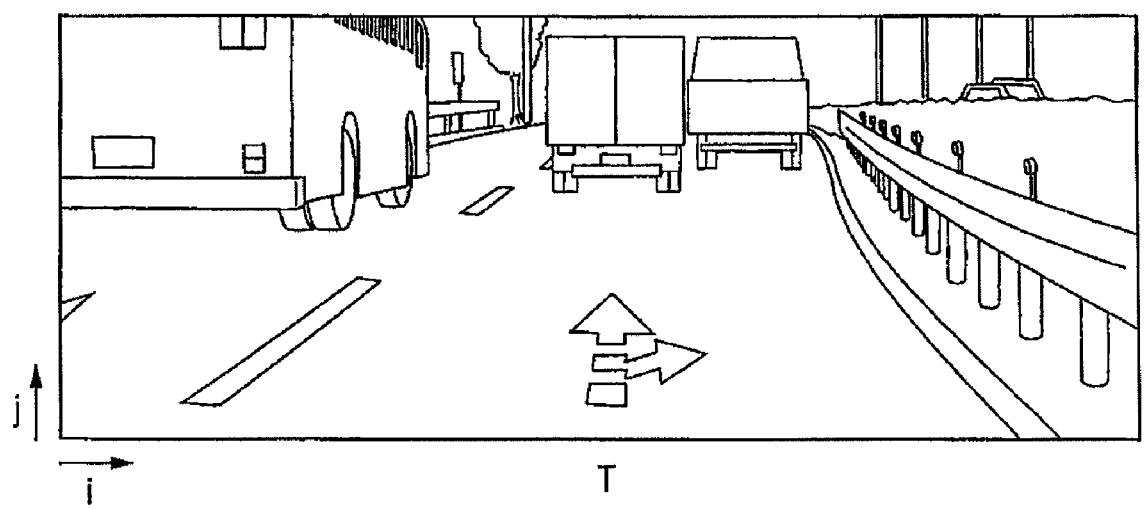
FIG. 2 is a diagram showing an example of a reference image.

Of the pair of cameras making up the image capture module 2, the main camera 2a for capturing is the one lying closer to the driver for capturing, for example, reference image T shown in FIG. 2. And, the sub-camera 2b captures a comparison image for comparison with the reference image T.

Image data output from the main camera 2a and the sub-camera 2b is converted from analog images to digital images which has a luminance of a predetermined luminance level expressed per each of pixels, for example, based on a gray scale of 256 gray or luminance levels by A/D converters 3a, 3b which make up the conversion module 3. The digital images are corrected by image corrector 4 to remove deviation and noise. And the resulting images are stored in an image data memory 5 and then are transmitted to the computer 10.

In an image processor 7 in the image processing module 6, a stereo matching operation and a filtering operation are performed on the image data of the reference image T and the comparison image so as to calculate a disparity dp which corresponds to a distance in actual space. Hereinafter, an image to which disparity dp is allocated is referred to as a range image. Information on the disparity dp which is calculated in this way, that is, the range image is stored in a range data memory 8 of the image processing module 6.

Points (X, Y, Z) in actual space which results when assuming that the disparity dp, a point (i, j) on the range image and a point on the road surface which lies directly below a center between the pair of cameras 2a, 2b are original points and that a vehicle-width or transverse direction of the subject vehicle is an X-axis direction, a vehicle-height or vertical direction is a Y-axis direction and a vehicle-length or longitudinal direction is a Z-axis direction are associated uniformly by coordinate transformations which are expressed by Equations (1) to (3) below. In addition, in the respective equations below, CD denotes the interval between the pair of cameras, PW the angle of field of view, CH the mounting height of the pair of cameras, IV and JV an i coordinate and a j coordinate on the range image of a point at infinity forward of the subject vehicle and DP a vanishing point disparity.

$$X = CD/2 + Z \times PW \times (i-IV) \tag{1}$$

$$Y = CH + Z \times PW \times (j-IV) \tag{2}$$

$$Z = CD/(PW \times (dp-DP)) \tag{3}$$

The positional information collecting unit 9 for measuring a distance Z from the subject vehicle to a three-dimensional object which lies within a predetermined range ahead of the subject vehicle, that is, the disparity dp which is uniformly associated with the distance Z by Equation (3) above is made up of the constituent modules which arranged from the image capture unit 2 to the image processing module 6 which includes the image processor 7 and the range data memory 8, and the positional information collecting unit 9 corresponds to the distance detector for calculating the distance Z between the subject vehicle and the preceding vehicle.

Note that the distance detector may be in any form as long as it can calculate or measure the distance Z between the subject vehicle and the preceding vehicle, and in addition to the configuration described in the embodiment, the distance detector can be made up, for example, by a radar unit for emitting a laser beam or infrared light ahead of the subject vehicle so as to measure the distance Z to the object based on information on its reflected light, and as to the method for detecting the distance, there is specified no particular method.

The computer 10 is made up of a CPU, a ROM, a RAM, and an input/output interface, which are connected to a bus. In addition, sensors Q such as a vehicle speed sensor, a yaw rate sensor, and a steering sensor for measuring a turning or steering angle of a steering wheel are connected to the computer 10. In addition, in place of the yaw rate sensor, a device can be used which estimates a yaw rate from the vehicle speed of the subject vehicle.

As is shown in FIG. 1, the computer 10 includes an object detecting unit 11, a setting unit for monitoring range 12, a determining unit 13 and an adjusting unit 14, and furthermore, the computer 10 includes a memory, not shown. In addition, necessary data is inputted into the respective units of the computer 10 from the sensors Q.

The object detecting unit 11 is configured based on a vehicle outside monitoring system which is disclosed in the published documents of the patent applications that had been filed by the applicant of this patent application such as JP-A-10-283461. In the object detecting unit 11, firstly a three-dimensional object detecting operation is performed, but since the operation is disclosed in detail in those unexamined patent publications, those documents should be referred to for detailed description of the module in question.

While a preceding vehicle is described as being an object to be detected by the object detecting unit 11, the object is not limited thereto. The object detecting unit 11 performs a three-dimensional object detecting operation for detecting a three-dimensional object from the reference image T, then to perform a traveling locus estimating operation for estimating a locus along which the subject vehicle will follow to travel from now on (hereinafter, referred to as a traveling locus), and finally to perform an object detecting operation for detecting the preceding vehicle from three-dimensional objects so detected based on the traveling locus so estimated.

In the three-dimensional object detecting operation, the object detecting unit 11 gathers information on positions which are adjacent to each other into groups based on positional information of three-dimensional objects, that is, disparities dp and classifies a disparity dp in each group into a subgroup which is substantially parallel to the transverse direction of the subject vehicle and a subgroup which is substantially parallel to the traveling direction of the subject vehicle so as to detect a three-dimension object.

Specifically, the object detecting unit 11 reads the range image from the range data memory 8 and divides the range image into strip-like portions which extend in the vertical direction with predetermined pixel widths. Then, the object detecting unit 11 converts disparities which belongs to each strip-like portion into distances Z according to Equation (3) above, prepares a histogram for a distance of the distances Z so converted which is positioned as existing above the road surface and regards a distance to a section having a maximum gray or luminance level as a distance to a three-dimensional object in the strip-like portion. The object detecting unit 11 performs this operation on the whole portions. Hereinafter, the distance which represents each portion is regarded as the distance Z.

Figure 3:
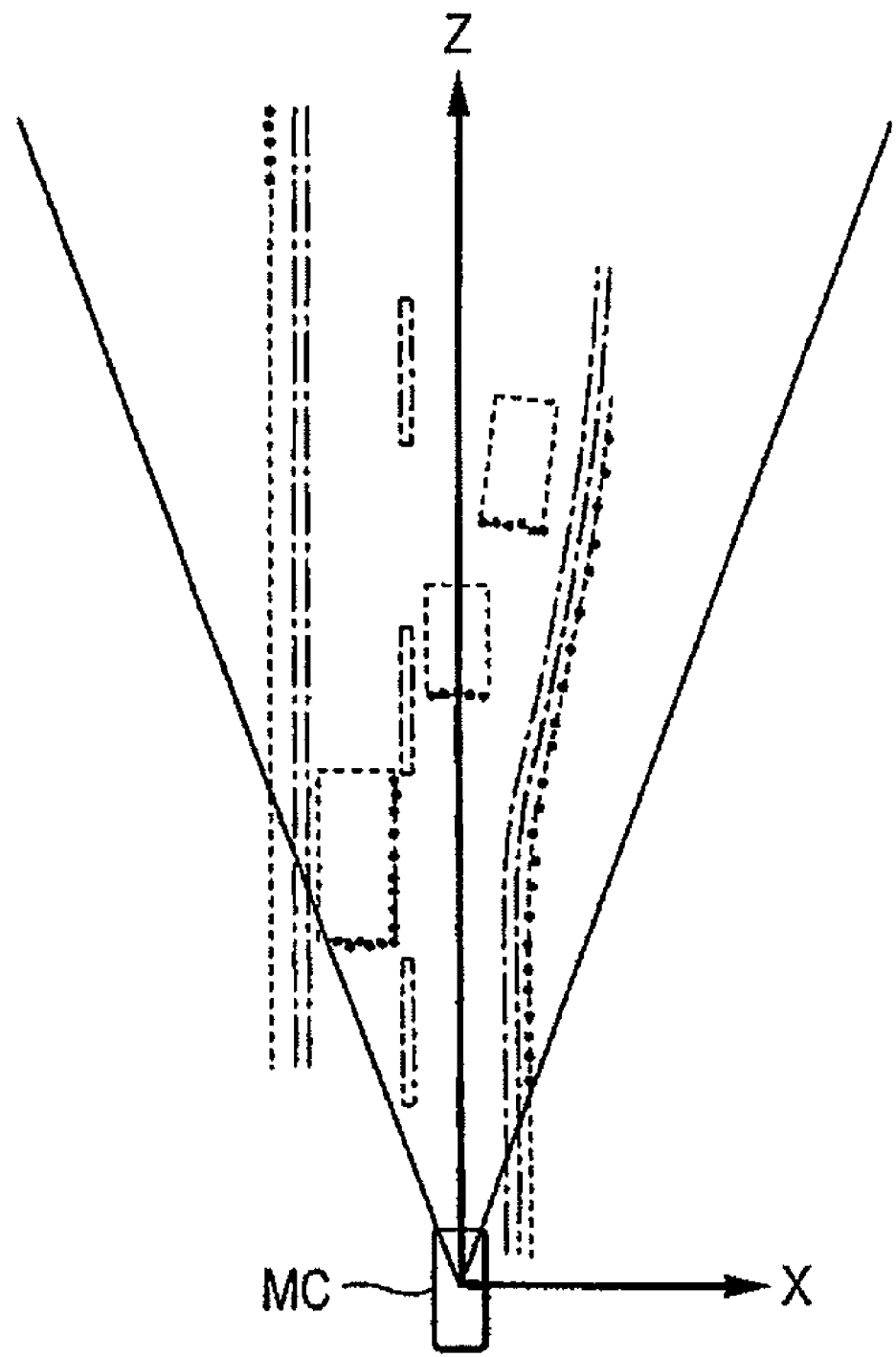
FIG. 3 is a diagram showing plotted points in per section of distances on an actual space.

For example, when calculating the distance Z for a range image prepared from the reference image T shown in FIG. 2 and plotting distances Z so calculated for the respective portions on an actual space, the distances Z are plotted as having a slight variation in portions of three-dimensional objects lying ahead of the subject vehicle which correspond to portions facing the subject vehicle MC as shown in FIG. 3.

Figure 4:
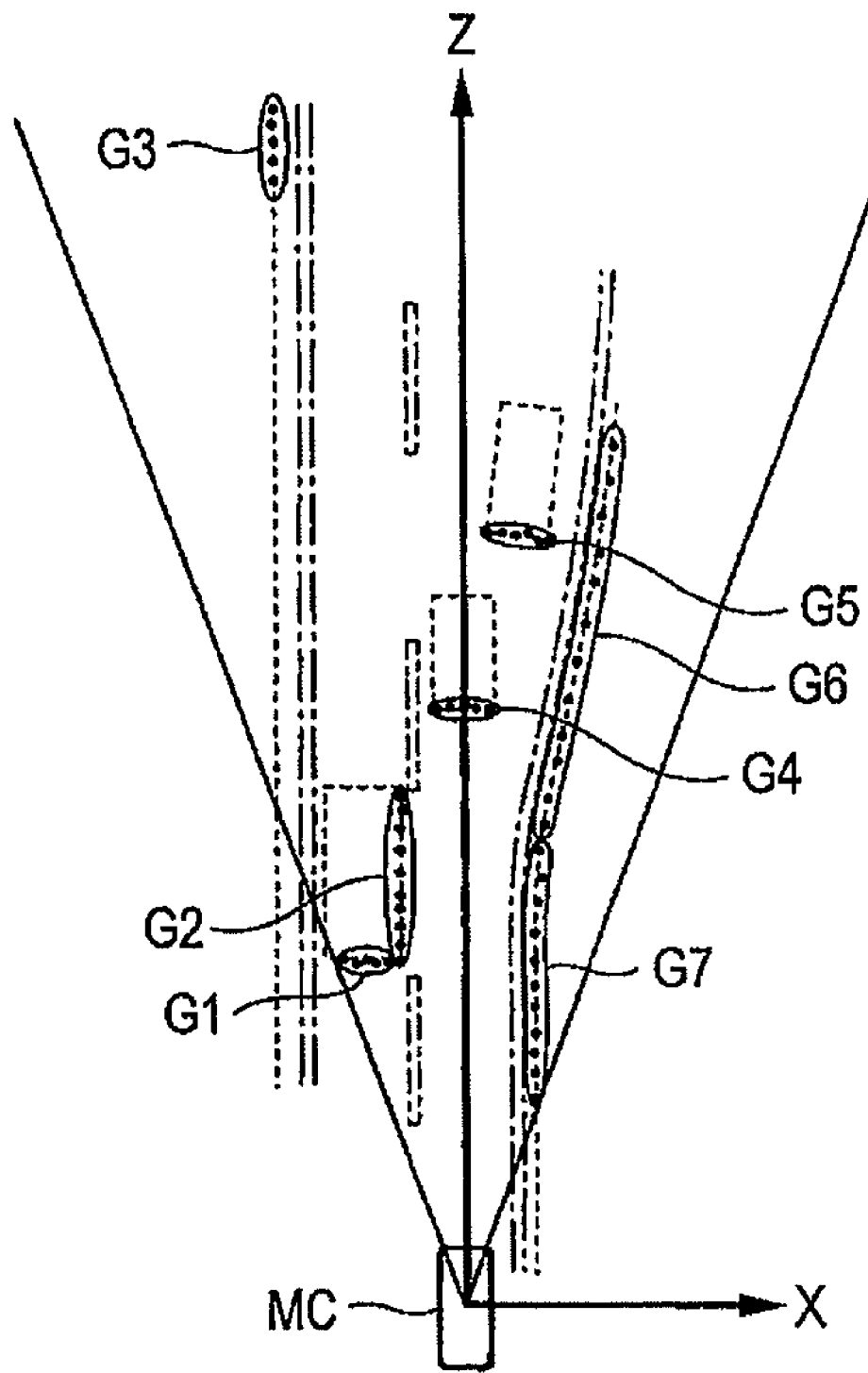
FIG. 4 is a diagram showing groups which result when the points in shown FIG. 3 are grouped.
Figure 5:
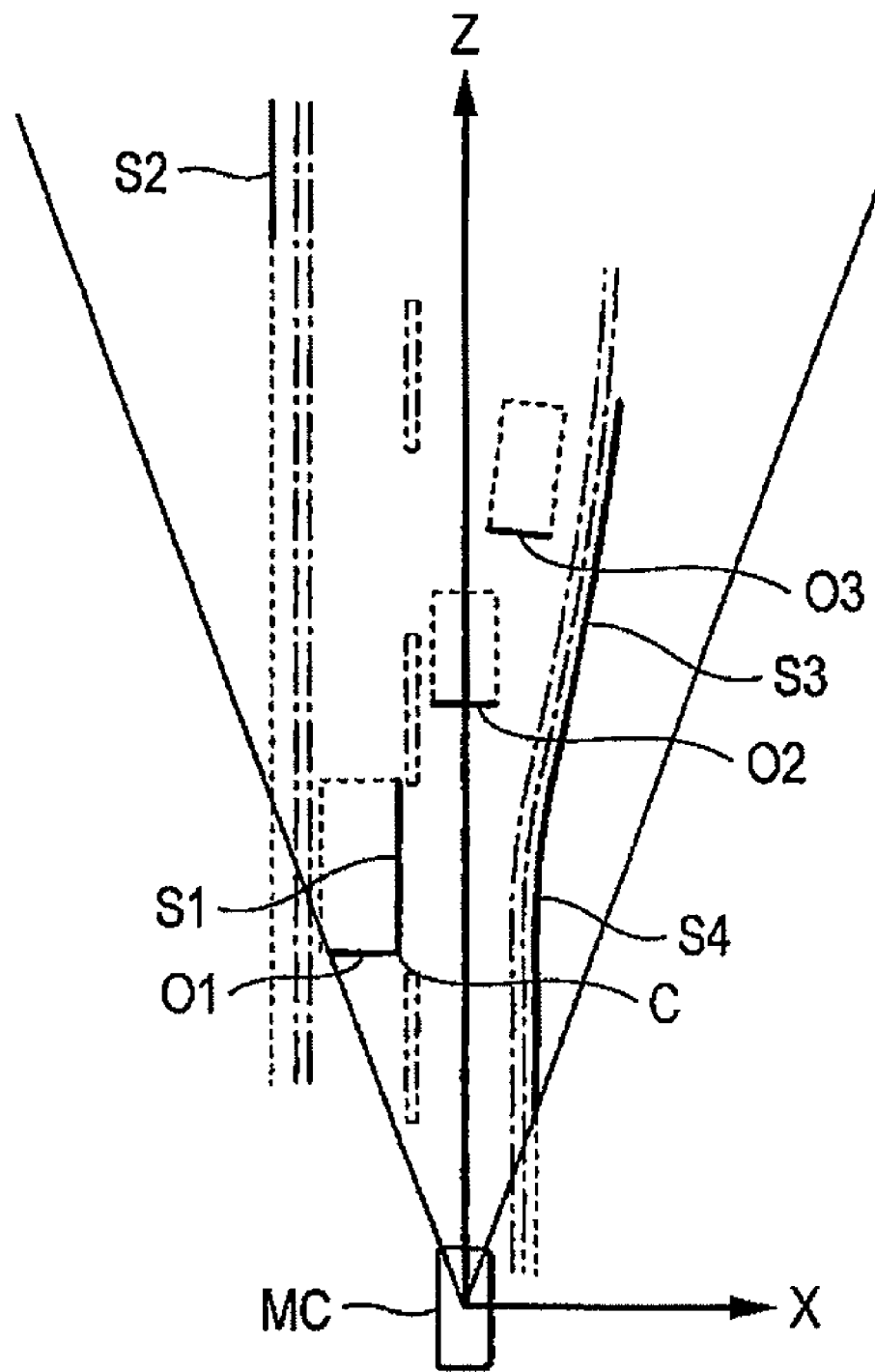
FIG. 5 is a diagram showing subgroups which are formed when the groups shown in FIG. 4 are classified.

The object detecting unit 11 gathers points of the points so plotted which lie adjacent to each other into groups G1 to G7 based on the distance between the points lying close to each other and directionality thereof as shown in FIG. 4 and labels for classification subgroups of the respective groups which are each made up of points which are aligned substantially parallel to the transverse direction of the subject vehicle MC, that is, the X-axis direction "objects" O1 to O3 and subgroups which are each made up of points which are aligned substantially parallel to the traveling direction of the subject vehicle MC, that is, the z-axis direction "side walls" S1 to S4. In addition, the object detecting unit 11 labels an intersection point between the "object" and the "side wall" of the three-dimensional object a corner point C.

Figure 6:
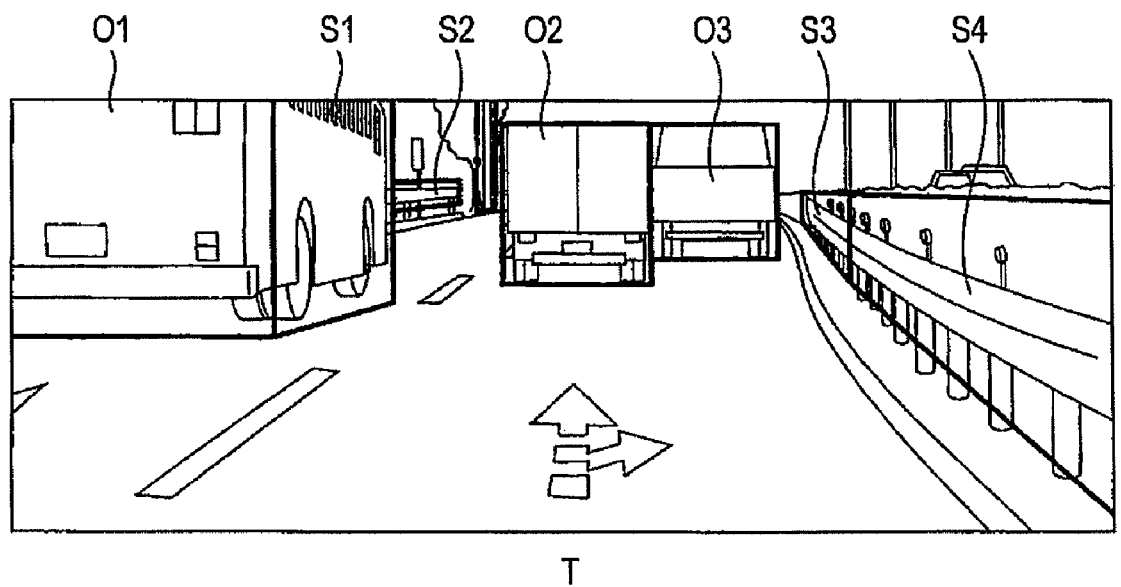
FIG. 6 is a diagram showing three-dimensional objects which are indicated by rectangular frame lines on the reference image.

In this way, the object detecting unit 11 detects the "object O1, corner point C, side wall S1," the "side wall S2," the "object O2," the "object O3," the "side wall S3," and the "side wall S4" as three-dimensional objects, respectively. In addition, as is shown in FIG. 6, the object detecting unit 11 detects the three-dimensional objects in the reference image T in such a manner as to surround them by rectangular frame lines.

The object detecting unit 11 stores information on the three-dimensional objects which are detected in the way described above and coordinates of end points of the respective subgroups and coordinates of apexes of the respective frame lines on the reference image T and to output them as required.

Following this, the object detecting unit 11 estimates a traveling locus of the subject vehicle based on the behaviors of the subject vehicle. Specifically, the object detecting unit 11 calculates a turning curvature Cua of the subject vehicle based on behaviors of the subject vehicle such as vehicle speed V, yaw rate γ and steering angle δ of the steering wheel of the subject vehicle which are inputted from the sensors Q such as the vehicle speed sensor, the yaw rate sensor and the steering angle sensor and calculate and estimate a traveling locus Lest of the subject vehicle MC based on the turning curvature Cua so calculated, as is shown on the actual space in FIG. 7.

Based on, for example, the vehicle speed V and the yaw rate γ, the turning curvature Cua can be calculated according to the following equation;

$$Cua = \gamma/V \qquad (4)$$

In addition, based on the vehicle speed V and the steering angle δ, the turning curvature Cua can be calculated according to the following equations;

$$Re = (1 + Asf \cdot V^2) \cdot (Lwb/\delta) \qquad (5)$$

$$Cua = 1/Re \qquad (6)$$

where, Re denotes a turning radius, Asf a stability factor of the vehicle and Lw a wheelbase.

Figure 7:
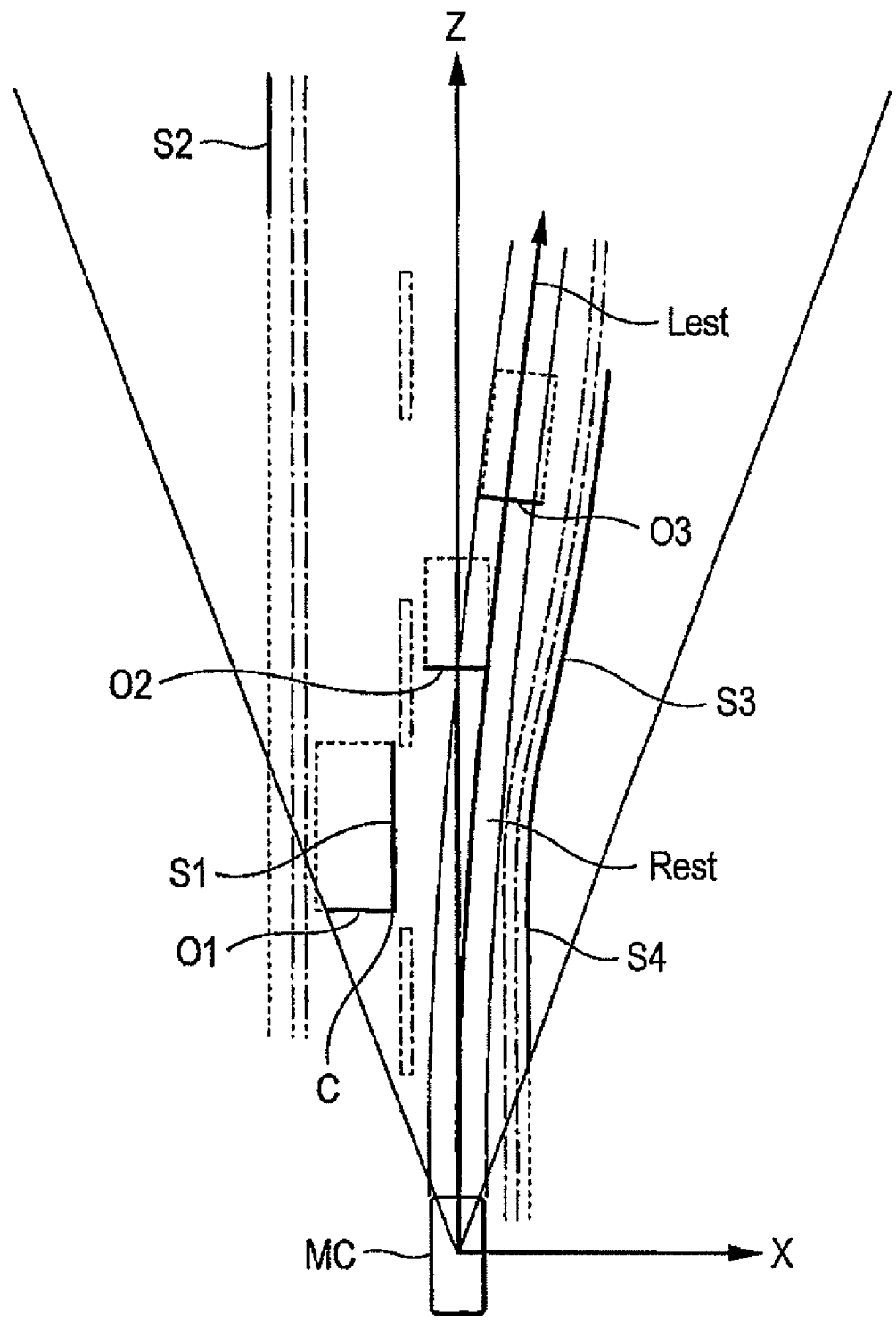
FIG. 7 is a diagram which explains a traveling locus and a traveling course of a subject vehicle.

In addition, in this embodiment, as is shown in FIG. 7, the object detecting unit 11 is designed to grasp a range equal to the width of the subject vehicle which is centered at the traveling locus Lest as a traveling course Rest. The object detecting unit 11 stores information the traveling locus Lest and the traveling course Rest of the subject vehicle MC which are estimated in the way described above and output them as required.

Next, the object detecting unit 11 detects a preceding vehicle from the three-dimensional objects detected based on the traveling locus Lest.

The object detecting unit 11 detects the three-dimensional object which is the closest to the subject vehicle as a preceding vehicle and specifically detects as a preceding vehicle among the three-dimensional objects lying on the traveling course Rest of the subject vehicle which are grasped in the traveling locus estimating operation the three-dimensional object which lies closes to the subject vehicle, that is, the object O2 in the example described above.

Furthermore, the object detecting unit 11 reads out the information on the preceding vehicle which was detected previously from the memory and calculates a probability that the preceding vehicle so detected previously and the three-dimensional object detected this time are the same three-dimensional object based on the positional relationship between the preceding vehicle so detected previously and the three-dimensional object detected this time as being the closest to the subject vehicle and the traveling speed, and in the event that the probability so calculated is equal to or more than a preset threshold value, the object detecting unit 11 labels the three-dimensional object detected this time a preceding vehicle to thereby detect the preceding vehicle and updates the information on the preceding vehicle with the information on the three-dimensional object detected this time so as to continuously register the preceding vehicle information in the memory. Thus, the object detecting unit 11 traces the preceding vehicle while updating the information thereon.

The object detecting unit 11 traces the preceding vehicle while storing the information thereof in the memory in the way described above and output the information so stored as required.

In addition, the object detecting unit 11 is also made to calculate a distance between plots lying at both ends of the group G4 among the groups G1 to G7 shown in FIG. 4 which corresponds to the preceding vehicle O2 so as to temporarily store it in the memory as a width W of the preceding vehicle O2 which was detected this time. In addition, it is possible to configure such that a transverse width of the rectangular frame line which indicates the preceding vehicle O2 which was detected this time is calculated as the width W of the preceding vehicle O2.

In the modules from the monitoring range setting unit 12 onward, a monitoring range for monitoring an oncoming vehicle is set on a right-hand side (a left-hand side in the United States of America and the like) or a side facing a lane for oncoming vehicles of the preceding vehicle so detected in the reference image T by the object detecting unit 11 in the way described above, and when an oncoming vehicle is detected within the monitoring range, in addition to the normal exposure adjustment which is automatically performed on the image capture module 2, an exposure adjustment is designed to be performed, as it were, forcibly, in such a way as to increase or decrease the luminance of each pixel of the reference image T and the comparison image which is output from the image capture module 2.

In addition, in this forced exposure adjustment, since the three-dimensional object detecting operation in the object detecting unit 11 is made difficult to be implemented in the event that the luminance of each pixel is decreased drastically, in this embodiment, the level of the forced exposure adjustment is increased step by step in each sampling cycle so that the luminance of each pixel output is decreased gradually in each sampling cycle.

Hereinafter, operations which are to be performed in the modules from the monitoring range setting unit 12 onward will be described while following a flowchart shown in FIG. 8.

Figure 9:
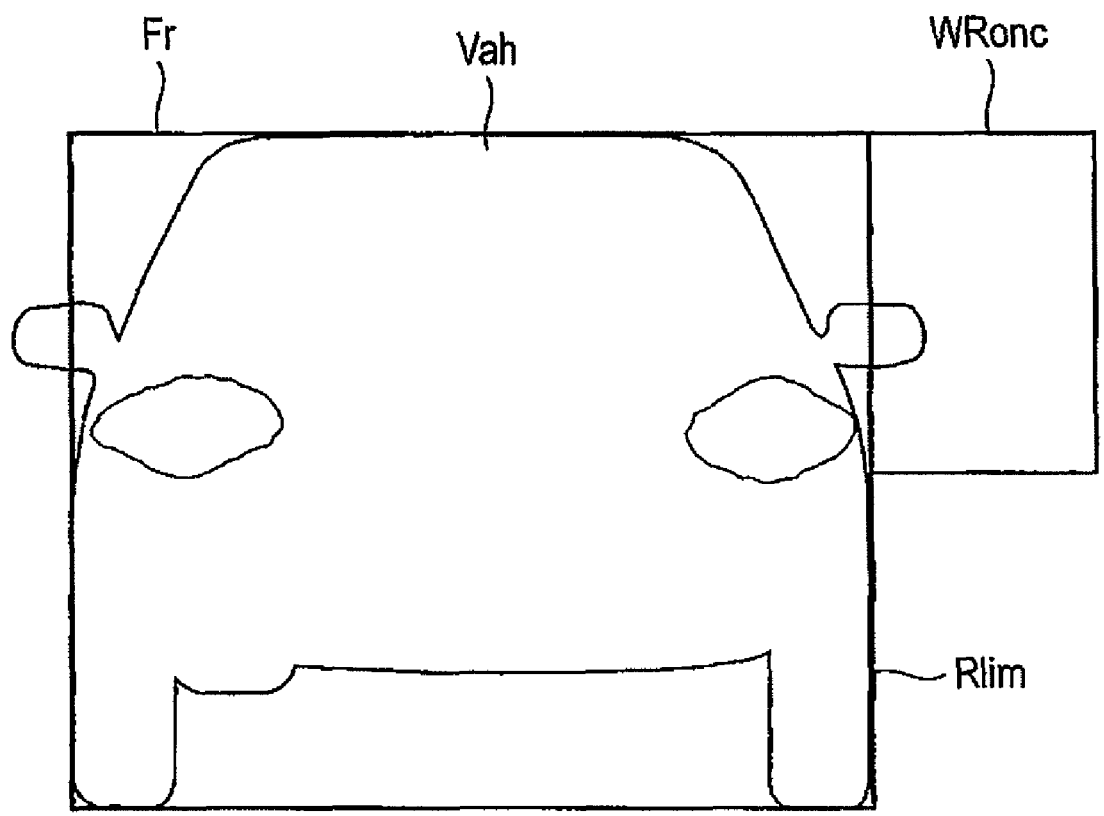
FIG. 9 is a diagram showing a monitoring range set to the side of the object.

The monitoring range setting unit 12 sets a monitoring range WRonc to the side of a preceding vehicle Vah based on a right-hand side edge portion of an object detected on the reference image T, that is, the preceding vehicle Vah which is surrounded by a frame line Fr as shown in FIG. 9 in this embodiment. In addition, the preceding vehicle, which is the object, is generally referred to as the preceding vehicle Vah, including the preceding vehicle O2.

In addition, the monitoring range setting unit 12 sets the monitoring range in such a case that the headlamps of an oncoming vehicle are illuminated as when it is driven at night or through a tunnel. A determination of whether or not there exists a situation where the headlamps of an oncoming vehicle are illuminated may be made by the monitoring range setting unit 12 by itself or by another module. In addition, the determination is made based on the situations where the shutter time adjustment and the amplifier gain switching are performed while monitoring the state of automatic adjustment of the CCD camera, for example.

When determining that the subject vehicle is traveling at night or through a tunnel or obtaining information to that effect, the monitoring range setting unit 12 firstly determines whether or not a light source detection flag Fa is 0 (step S1).

The light source detection flag Fa is such as to be set to 1 when a light source such as a headlamp of an oncoming vehicle is being detected within the monitoring range, whereas it is set to 0 when no such light source is being detected. If a light source is being detected within the monitoring range (Fa=1), in addition to the normal exposure adjustment mentioned above, the forced exposure adjustment, which is separate from the normal one, is activated by the adjusting unit 14, which will be described later, of the computer 10, and a state results in which the level of the forced exposure adjustment is enhanced or the level thereof in the immediately preceding sampling cycle is maintained. In addition, if no light source is being detected within the monitoring range (Fa=0), the level of the forced exposure adjustment is decreased or 0. In an initial state, the light source detection flag Fa is set to 0.

Figure 10:
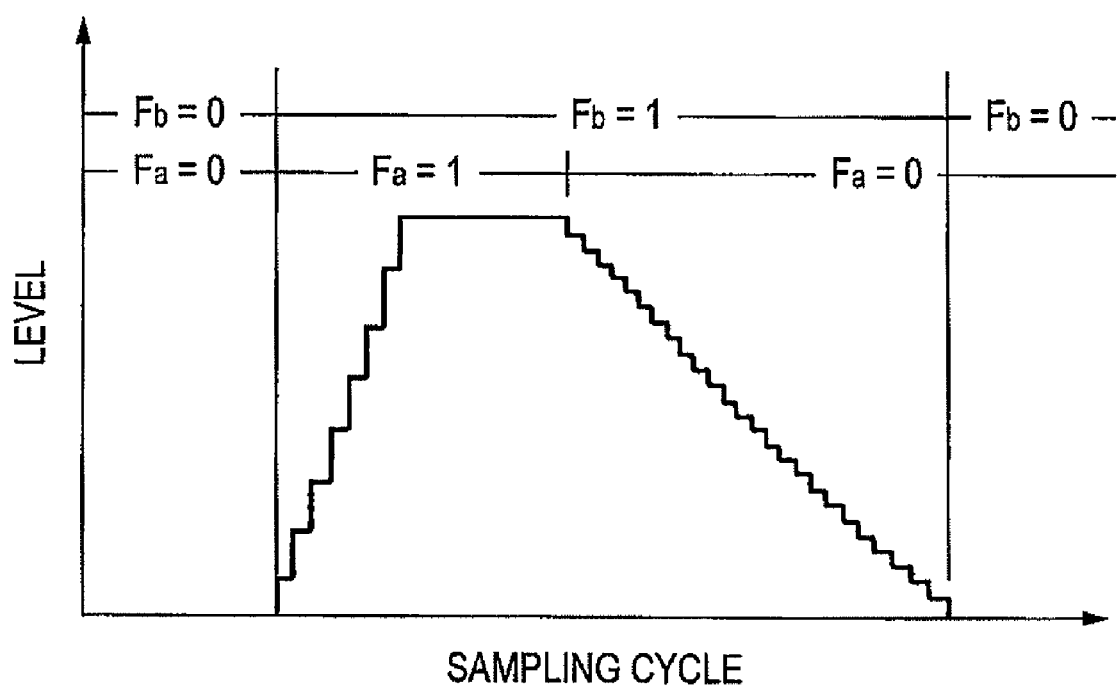
FIG. 10 is a graph showing a transition of a level of a forced exposure adjustment.

In addition, a forced adjustment operation flag Fb is such as to be set to 1 when the forced exposure adjustment is being performed by the computer 10, whereas the flag is set to 0 in other cases. Namely, as is shown in FIG. 10, in such a state that the light source is being detected within the monitoring range and the level of the forced exposure adjustment is enhanced or remains the same, since at least the force exposure adjustment is being performed, the forced adjustment operation flag Fb is always 1 whenever the light source detection flag Fa is 1.

If the light source detection flag Fa is 0 (step S1: YES), a light source such as a headlamp of an oncoming vehicle is not being detected within the monitoring range WRonc, and the preceding vehicle Vah is detected as far as the right edge thereof by the object detecting unit 11. Therefore, the monitoring range setting unit 12 specifies a preceding vehicle area which indicates the position of the preceding vehicle Vah in the reference image as an area which is defined by the frame line Fr which surrounds the preceding vehicle Vah shown in FIG. 9.

Then, the monitoring range setting unit 12 sets a monitoring range WRonc having a predetermined pixel area further outwardly rightwards than a light edge line Rlim of the frame line Fr indicating the preceding vehicle Vah to the side of the point of infinity on the reference image in such a manner as to be brought into contact with the right edge line Rlim (step S3).

On the other hand, if the light source detection flag Fa is 1 (step S1: NO), a light source such as a headlamp of an oncoming vehicle is being detected within the monitoring range WRonc, and due to the influence of the headlamp of the oncoming vehicle, it not always true that a distance from the subject vehicle to a light edge portion of the preceding vehicle Vah is detected properly.

Due to this, the monitoring range setting unit 12 reads a width car_width of the preceding vehicle Vah which is stored in the memory while being updated as will be described later, prepares a similar frame line to the frame line Fr shown in FIG. 9 which has its right edge (left and right are reversed in the United States of America and the like) in a position lying apart a distance equal to the width car_width from a left edge of the preceding vehicle Vah detected by the object detecting unit 11, and specifies the preceding vehicle area which indicates the position of the preceding vehicle in the reference image as the area defined by the frame line.

Next, in the determining unit 13, whether or not a light source exists within the monitoring range WRonc is determined. In this embodiment, the determining unit 13 firstly counts the number of pixels having a luminance which is equal to or more than a threshold value br_th1 (first predetermined threshold value) which is preset to a high luminance of 250 when expressed by, for example, the luminance scale of 256 levels from 0 to 255 (step S5). As this occurs, it is properly preset whether the whole pixels within the monitoring range WRonc are used for determination of luminance or the pixels are checked at intervals of several pixels.

Figure 11:
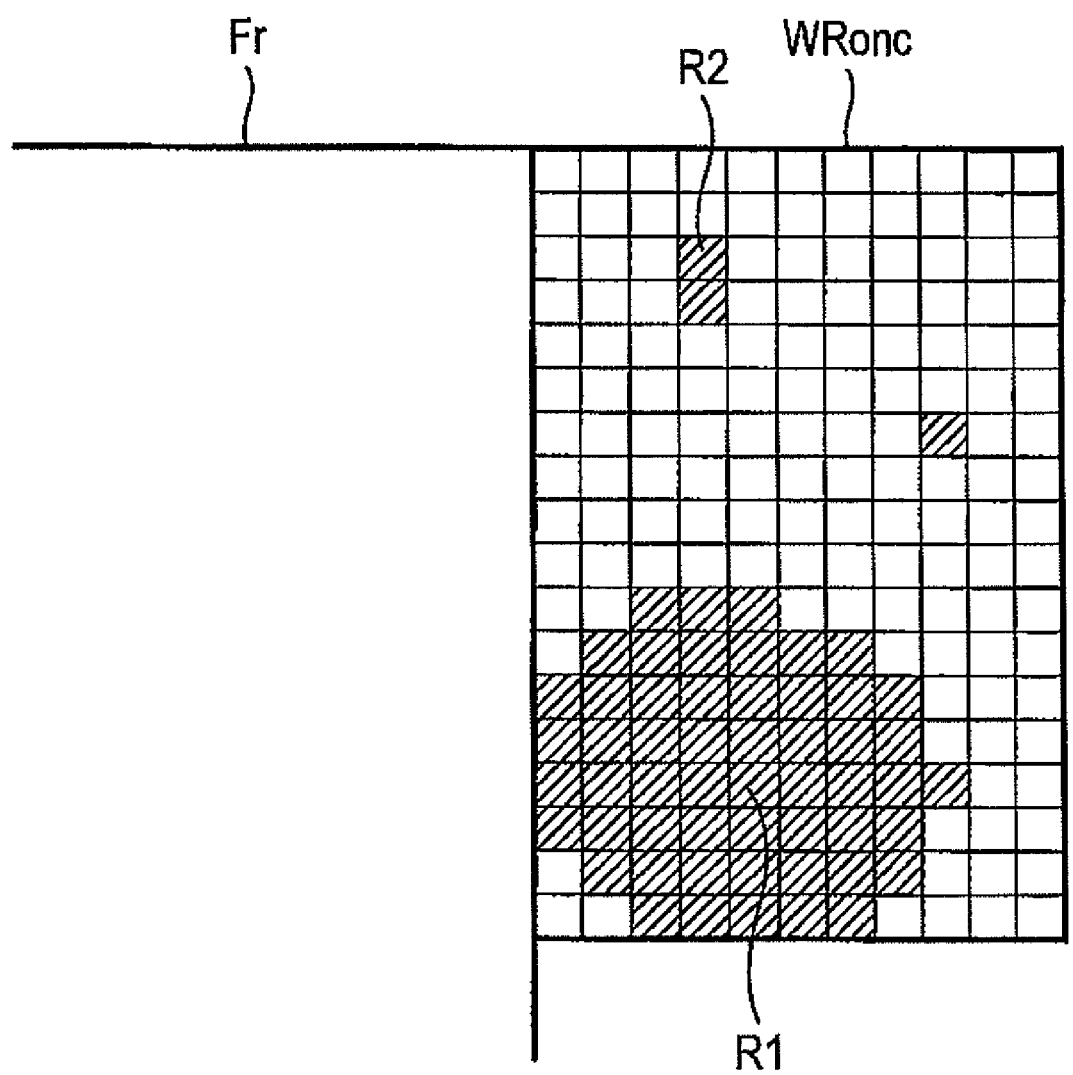
FIG. 11 is a diagram which explains pixel areas where pixels having a high luminance and adjacent pixels having the high luminance are collected in a monitoring area.

In order to detect in a further ensured fashion that the pixels having the high luminance which is equal to or more than the threshold value br_th1 within the monitoring range WRonc are not such as to be captured highly brightly due to image capturing errors but such as to so captured as a result of the light source such as the headlamp of the oncoming vehicle being captured, for example, among the pixels having the luminance equal to or more than the preset threshold value br_th1, as is shown in FIG. 11, the numbers of pixels of pixel areas R1, R2 into which pixels lying adjacent to each other are grouped may be made to be counted. Furthermore, only the number of pixels of a pixel area into which pixels lying adjacent to each other are grouped may be made to be counted whose shape is considered to result from the detection of the light source.

Following this, if the forced adjustment operation flag Fb is 0 (step S6: YES) and the number of pixels counted is less than a preset threshold value count_th (second predetermined threshold value) (step S7: NO), the determining unit 13 determines that a light source such as a headlamp of an oncoming vehicle does not exist in the monitoring range WRonc. Due to this, in this case, the forced exposure adjustment described above is not performed.

In addition, in this case, since the preceding vehicle Vah is detected normally as far as the right edge thereof by the object detecting unit 11, the determining unit 13 updates the width car_width of the preceding vehicle Vah which is the transverse width of the object and store it in the memory (step S8).

The width car_width of the preceding vehicle Vah is designed to be calculated by being smoothed by a time constant filer which is expressed by Equation (7) below based on the width W of the preceding vehicle vah which was detected this time by the object detecting unit 11 and is temporarily stored in the memory.

$$\text{car\_width} \leftarrow \text{car\_width} \times 0.9 + W \times 0.1 \qquad (7)$$

Note that the arrow in Equation (7) above means that the value in the memory is updated by the value of the right-hand member, and specifically, it means that the calculation on the right-hand member is performed to overwrite the value in the memory and the resulting value is stored. In addition, in smoothing, other smoothing filters such as Kalman filter or moving average filter may be used.

In addition, even though the forced adjustment operation flag Fb is 0 (step S6: YES), if the pixel number counted is equal to or more than the threshold value count_th (step S7: YES), the determining unit 13 determines that a light source such as a headlamp of an oncoming vehicle is detected within the monitoring range WRonc. In this case, since it is not necessarily true that the preceding vehicle Vah is detected normally as far as the right edge thereof by the object detecting unit 11, the updating of the width car_width of the preceding vehicle Vah is not performed.

Then, the determining unit 13 outputs to the adjusting unit 14 an increase signal which signals to increase the level of the forced exposure adjustment so as to perform the forced exposure adjustment described above.

The adjusting unit 14 outputs a signal which signals to adjust at least one of the exposure amount of the image capture module 2 and the luminance of pixels output from the image capture module 2 to the image capture module 2 in response to the increase signal or a decrease signal, which will be described later, from the determining unit 13.

When the increase signal signaling to increase the level of the forced exposure adjustment is output from the determining unit 13, a signal is output from the adjusting unit 14 to the image capture module 2 which signals to increase the level of the forced exposure adjustment by a predetermined adjustment amount as is shown in FIG. 10, whereby the luminance of the respective pixels of the reference image and the comparison image which are output from the image capture module 2 is decreased as a whole. In addition, in the event that the luminance of the respective pixels is decreased excessively, since there is produced a state in which only the tail lamps of the preceding vehicle and the headlamp of the oncoming vehicle are captured in the reference image and the comparison image with almost no other things captured therein, a predetermined limit amount is set to the added adjustment amount as is shown in FIG. 10.

On the contrary, in the event that a decrease signal is output from the determining unit 13 which signals to decrease the level of the forced exposure adjustment, a signal is output from the adjusting unit 14 to the image capture module 2 which signals to decrease the level of the forced exposure adjustment level by a predetermined adjustment amount, whereby the luminance of the respective pixels in the reference image and the comparison image which are output from the image capture module 2 is increased as a whole.

When receiving the increase signal transmitted from the determining unit 13, the adjusting unit 14 causes the image capture module 2 to increase the level of the forced exposure adjustment by the predetermined adjustment amount in response to the reception of the increase signal (step S9), sets the light source detection flag Fa to 1 because it is determined that a light source such as a headlamp of an oncoming vehicle has been detected in the monitoring range WRonc (step S10) and sets the forced adjustment flag Fb to 1 because the forced exposure adjustment is being performed (step S11).

On the other hand, in such a state that it is determined that a light source such as a headlamp of an oncoming vehicle has been detected in the monitoring range WRonc, the forced exposure adjustment has been started and the forced adjustment operation flag Fb has been set to 0, the determining unit 13 determines in the determination in the step S6 that the forced adjustment operation flag Fb is not 0 (step S6: NO).

Then, it is judged whether the level of the forced exposure adjustment is increased further, or the forced exposure adjustment is kept staying at the current level or, the current level is decreased.

The determining unit 13 firstly determines whether or not the number of pixels having the high luminance within the monitoring range WRonc which were counted in the step S5 is equal to or more than the threshold value count_th (step S12), if the pixel number is determined to be equal to or more than the threshold value count_th (step S12: YES), the determining unit 13 determines that a light source such as a headlamp of an oncoming vehicle is being detected within the monitoring range WRonc and causes the adjusting unit 14 to increase the level of the exposure adjustment by the predetermined adjustment amount if the adjustment amount has not yet reached the limit value (step S13).

Even though the number of pixels having the high luminance in the monitoring range WRonc which were counted in the step S5 is determined to be less than the threshold value count_th (step S12: NO), if the pixel number so counted is not 0 (step S14: NO), the determining unit 13 continues to determine that a light source such as a headlamp of an oncoming vehicle is being detected within the monitoring range WRonc and maintains the current level of the forced exposure adjustment without increasing the same (step S15).

When determining that the number of pixels having the high luminance in the monitoring range WRonc which were counted in the step S5 is 0 (step S14: YES), the determining unit 13 determines that a light source such as a headlamp of an oncoming vehicle is not being detected within the monitoring range WRonc and causes the adjusting unit 14 to decrease the level of the forced exposure adjustment by the predetermined adjustment amount (step S16).

Then, since a light source such as a headlamp of an oncoming vehicle is not being detected within the monitoring range WRonc, the light source detection flag Fa is set to 0 (step S17), and if the normal level of the exposure adjusting function of the CCD camera has not yet been reached even though the level of the forced exposure adjustment is decreased (step S18: NO), the level of the forced exposure adjustment is decreased with the forced adjustment operation flag Fb kept staying at 1, and if the normal level of the exposure adjusting function of the CCD camera is reached as a result (step S18: YES), it being determined that the forced exposure adjustment is not being performed, the forced adjustment operation flag Fb is set to 0 (step S19).

Next, the function of the vehicle outside monitoring system 1 according to the embodiment will be described.

As has been described above, the two CCD cameras 2a, 2b, which make up the image capture module 2 of the embodiment, are synchronized with each other and as the function which is normally equipped on the CCD camera, the exposure adjustment is implemented automatically in order to obtain an optimum exposure, which exposure adjustment includes at least shutter time adjustment, amplifier gain switching, and selection from an LUT (Look Up Table) for conversion of luminance.

When it is sensed that the subject vehicle is driven in such a situation where the headlamps thereof need to be illuminated as when it is driven at night or through a tunnel, the monitoring range setting unit 12 of the computer 10 sets the monitoring range WRonc at the right-hand side of the frame line Fr which surrounds the preceding vehicle Vah which is detected on the reference image T as is shown in FIG. 9, whereby the forced exposure adjustment according to the embodiment is made ready or set on standby for operation on the image capture module 2 separately from the normal exposure adjustment.

Even though the monitoring range WRonc is set and the forced exposure adjustment is set on standby for operation, as long as a light source such as a headlamp of an oncoming vehicle is detected within the monitoring range WRonc, the forced exposure adjustment is not put in operation, and the image capture module 2 follows the normal exposure adjustment to adjust the exposure amount thereof and the luminance of pixels output from the image capture module 2.

Figure 12:
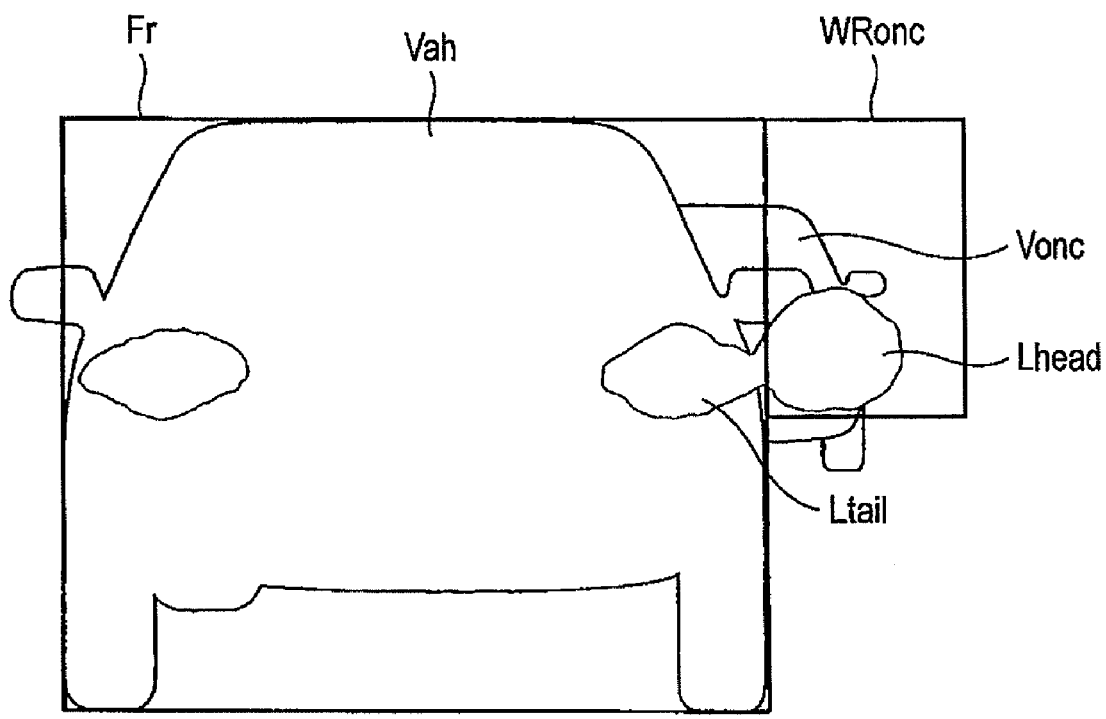
FIG. 12 is a diagram showing light of a headlamp of an oncoming vehicle and light of a tail lamp of a preceding vehicle, which are captured integrally.

As is shown in FIG. 12, however, when the number of pixels having the luminance which is equal to or more than the threshold value br_th1 which were counted in the monitoring range WRonc reaches or exceeds the threshold value count_th, both the light source detection flag Fa and the forced adjustment operation flag Fb are set to 1, whereby the forced exposure adjustment is activated.

Figure 13:
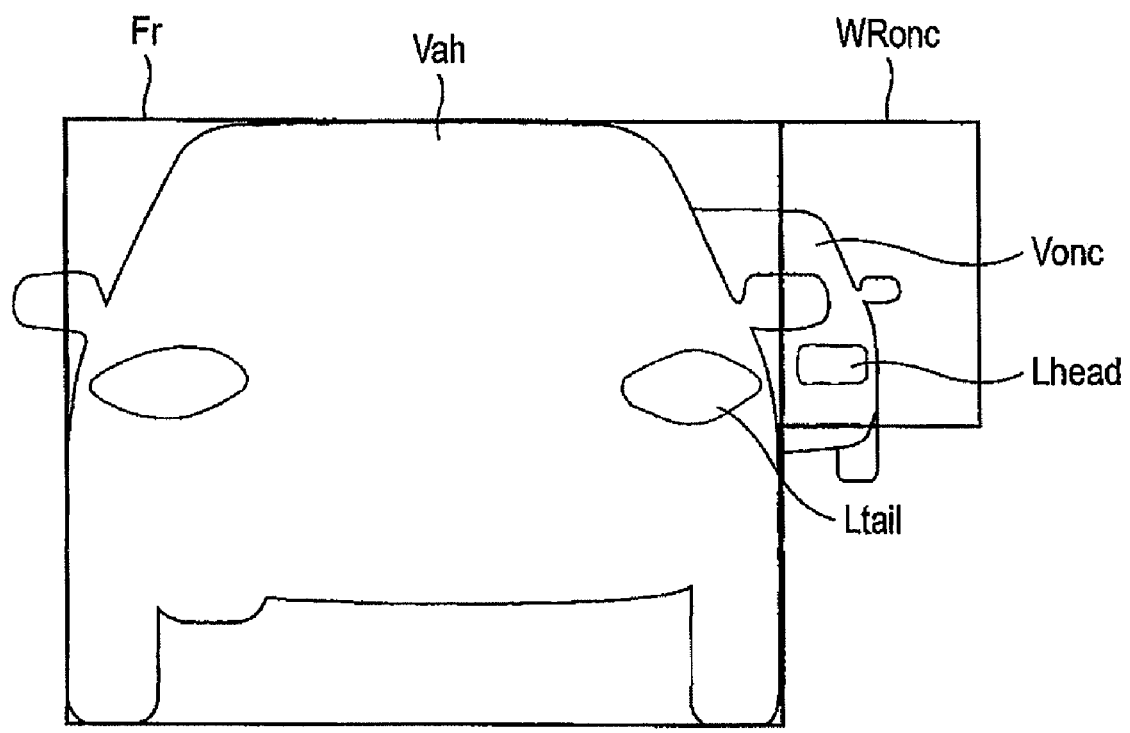
FIG. 13 is a diagram showing light of a headlamp of an oncoming vehicle and light of a tail lamp of a preceding vehicle, which are captured separately.
Figure 14:
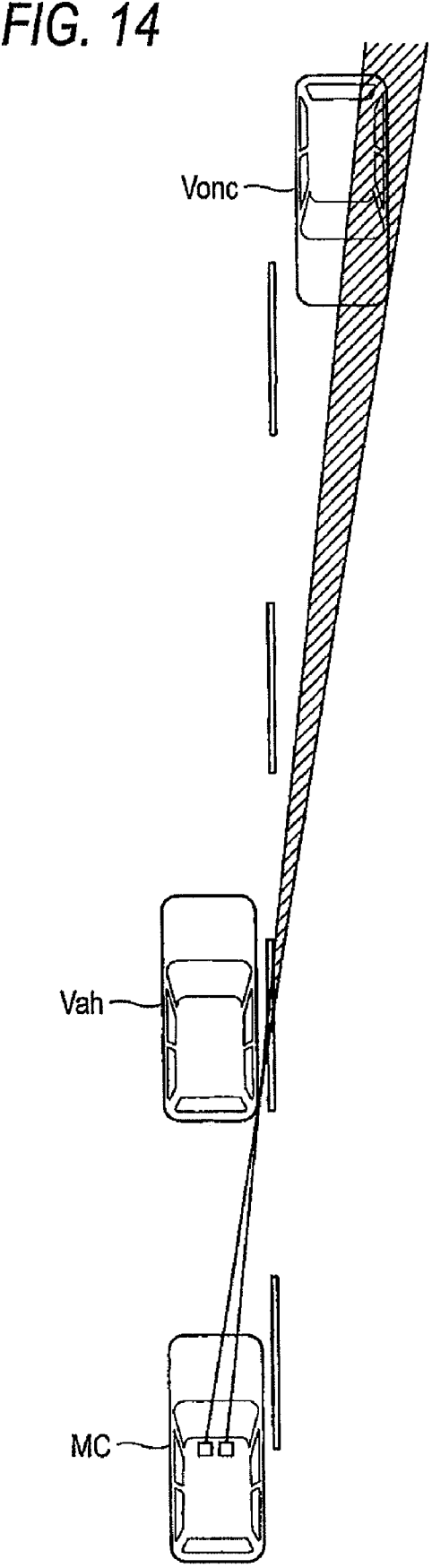
FIG. 14 is a diagram showing a range which is captured by one of two cameras and which is not captured by the other camera.

In the forced exposure adjustment, the level thereof is increased step by step and quickly as is shown in FIG. 10. Due to this, exposure adjustment is forcibly performed on light Lhead of a headlamp of an oncoming vehicle which expands on the reference image so as to be captured integrally with light Ltail of the tail lamp of the preceding vehicle Vah as is shown in FIG. 12 until the number of pixels of the light from the headlamp is decreased to be less than the threshold value count_th within the monitoring range WRonc, and as a result, as is shown in FIG. 13, the light Ltail of the tail lamp of the preceding vehicle Vah and the light Lhead of the headlamp of the oncoming vehicle Vonc are separated from each other on the reference image.

Figure 8:
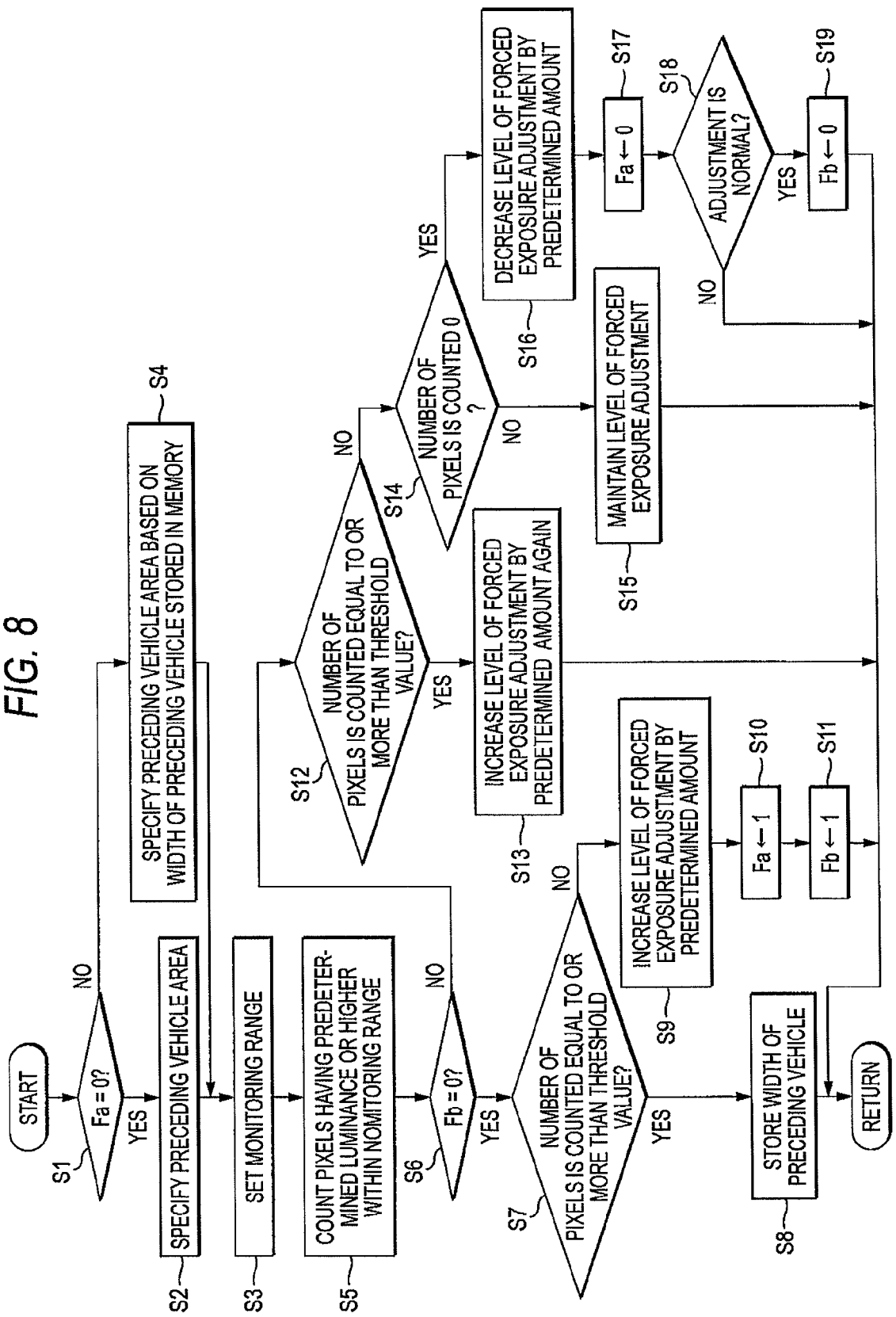
FIG. 8 is a flowchart showing a procedure of operations performed in parts from a monitoring range setting unit.

Even though the forced exposure adjustment is performed in this way, as long as the light source still exists within the monitoring range WRonc, and even though the number of pixels having the high luminance within the monitoring range WRonc is less than the threshold value count_th (step S12 in FIG. 8: NO), as long as the pixel number does not become 0 (step S14: NO), the level of the forced exposure adjustment is maintained.

Then, when no light source exists within the monitoring range WRonc and the number of pixels having the high luminance within the monitoring range WRonc becomes 0 (step S14: YES), the level of the forced exposure adjustment is decreased by the predetermined amount (step S16), whereby the light source detection flag Fa is set to 0 (step S17). Then, when the exposure adjustment level reaches the level of the normal exposure adjustment (step S18: YES), the forced adjustment operation flag Fb is set to 0 (step S19), the operation flow departing from the routine, whereby the exposure level of the forced exposure adjustment is decreased step by step as shown in FIG. 10 until the exposure adjustment level by the normal exposure adjustment is reached, and eventually, the forced exposure adjustment become inoperative, and the exposure adjustment performed on the image capture module 2 is returned to the normal exposure adjustment.

As has been described heretofore, in the normal exposure adjustment of the image capture module 2 such as the CCD camera, when the light source such as the headlamp of the oncoming vehicle Vonc which emits intense light is captured directly near the object, the side of the object which lies closer to the light source cannot be captured accurately due to the influence of the intense light, and for example, as is shown in FIG. 12, the light Ltail of the tail lamp of the preceding vehicle Vah and the light Lhead of the headlamp of the oncoming vehicle Vonc are captured integrally in the captured image, which results in a risk that the tail lamp of the preceding vehicle Vonc cannot be detected accurately or that the right-hand side or the side facing the oncoming vehicle Vonc of the preceding vehicle Vah cannot be captured accurately.

In addition, even though stereo matching is implemented by comparing the reference image and the comparison image in which the oncoming vehicle Vonc is not captured, no accurate comparison can be implemented, this producing a large detection error in the distance from the subject vehicle to the preceding vehicle Vah.

According to the vehicle outside monitoring system 1, the monitoring range WRonc for light source is provided in the appropriate position such as at the right-hand side edge of the preceding vehicle where the oncoming vehicle is captured, whereby the existence of a light source is monitored. Due to this, when there exists a light source, the influence of the light source so existing can be decreased and eliminated accurately by adjusting the exposure amount of the image capture module 2 and the luminance of pixels output from the image capture module 2.

In addition, when the existence of a light source is detected by counting pixels having the high luminance within the monitoring range WRonc, the transverse width of the object is detected for update while no light source exists in the monitoring range WRonc and it is determined that a light source exists in the monitoring range WRonc, the monitoring range WRonc is set in the position which lies apart the distance equal to the transverse width from the edge portion on the opposite side of the object to the side where the light source exists, whereby the monitoring range WRonc is set in the appropriate position, thereby making it possible to monitor the existence of a light source in an ensued fashion.

Furthermore, when adjusting the exposure amount of the image capture module 2 or the luminance of pixels output from the image capture module 2, the adjustment is implemented step by step and the level of the forced exposure adjustment is made not to be increased any further at a point in time at which the number of pixels having the high luminance within the monitoring range WRonc becomes less than the threshold value count_th, whereby the fear can be avoided that any other portions than the light sources such as the tail lamp and the headlamp cannot be discriminated in the captured image due to a drastic increase of the exposure adjustment level, thereby making it possible to implement the forced exposure adjustment appropriately.

Due to this, the detection of the tail lamps of the preceding vehicle Vah and stereo matching by comparison of the reference image with the comparison image, which are described above, can be implemented accurately.

Figure 15:
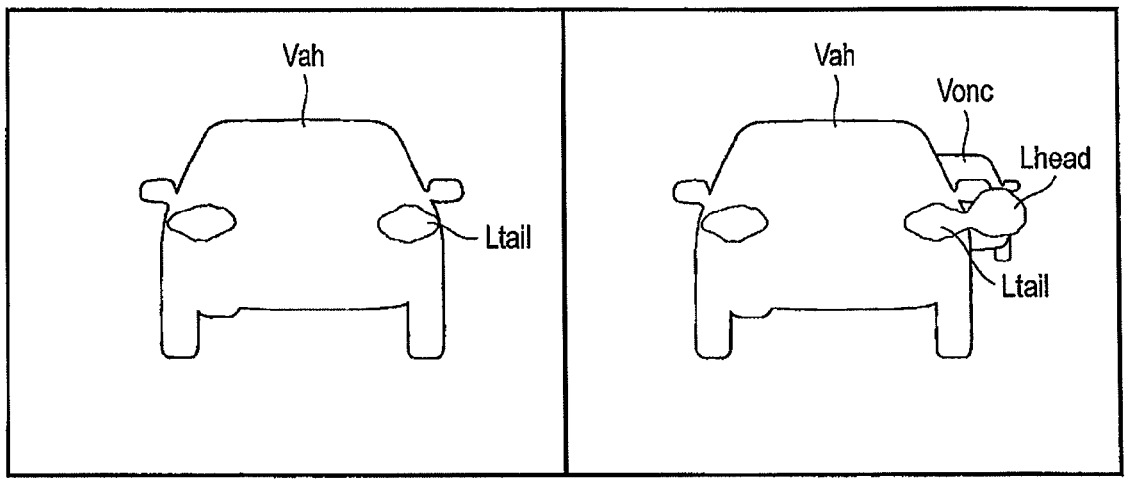
FIG. 15 is a diagram showing two captured images which are captured in the condition shown in FIG. 14.

Note that while in this embodiment, as has been described above, the information on disparities dp is collected by the positional information collecting module 9 which is the distance detector and the distance Z to the object is calculated based on the information so collected by the object detecting unit 11 so as to detect the object, as is shown in FIG. 15, in the event that a light source emitting intense light is captured as lying to the side of the object on the reference image, while the light source is not captured on the comparison image, the reliability of the information on the disparity dp on the light source side of the object and the distance Z based thereon is decreased.

To cope with this, while a light source is determined to exist within the monitoring range WRonc by the determining unit 13 and the light source detection flag Fa is set to 1 or the forced adjustment operation flag Fb is set to 1, in calculating a distance Z to the object by the object detecting unit 11, it is possible to configure such that a distance Z to the object is calculated using, among the pieces of information on the distances Z to the objects plotted on the actual space as is shown in FIGS. 3 and 4 only, the piece of information on the edge portion lying on the opposite side of the object to the side where the light source exists, for example, among the pieces of information on the distances Z to the preceding vehicle Vah which is the object, only the left-half pieces of information.

By adopting this configuration, the distance Z to the object can accurately be calculated without being affected by the light source.

In addition, while the transverse traveling speed of the object as viewed from the subject vehicle can be detected based on a positional change in the sampling cycle of the information on the distances Z to the objects plotted on the actual space, as this occurs, too, when it is determined that a light source exists within the monitoring range WRonc, it is possible to configure such that the transverse traveling speed is calculated using only the positional information on the edge portion on the opposite side of the object to the side where the light source exists.

By adopting the configuration, the transverse traveling speed of the object can accurately be calculated without being affected by the light source.

In this embodiment, a mode will be illustrated in which stereoscopic image capturing is implemented based on two cameras which function as image capture for capturing an image of surroundings in front of a subject vehicle, the image capture can be configured to include a single camera. In addition, a preceding vehicle detector may be in any form, provided that it can detect a preceding vehicle from an image captured by the image capture, and hence, the configuration of the preceding vehicle detector is not limited to a configuration which will be described in the embodiment of the invention hereinbefore.

What is claimed is:

1. A monitoring system comprising:
   a computer;
   an image capture unit for capturing an image;
   an object detecting unit for detecting an object from a captured image;
   a monitoring range setting unit for setting a monitoring range on a side of the object based on an edge portion of the object;
   a determining unit for determining an existence of a light source within the monitoring range; and
   an adjusting unit for adjusting at least one of an exposure of the image capture unit and a luminance of a pixel output from the image capture unit when the determining unit determines that the light source exists,
   wherein, through use of the computer, a transverse width of the object is detected and updated when the determining unit determines that the light source does not exist, and
   wherein, when the determining unit determines that the light source exists, the monitoring range setting unit sets the monitoring range based on an edge position on an opposite side of the object to a side thereof where the light source exists and the transverse width of the object which is stored.

2. The monitoring system according to claim 1,
   wherein the determining unit determines that the light source exists when detecting a predetermined number or more of pixels whose luminance exceeds a predetermined threshold value in the monitoring range.

3. The monitoring system according to claim 1,
   wherein the determining unit determines that the light source exists by detecting pixels whose luminance exceeds a first predetermined threshold value in the monitoring range, calculating the number of pixels in a pixel area where adjacent pixels of the detected pixels are gathered, and determining that the calculated number of pixels exceeds a second predetermined threshold value.

4. The monitoring system according to claim 1,
   wherein when the existence of the light source is determined, the adjusting unit adjusts step by step at least one of the exposure amount of the image capture unit and the luminance of the pixel output from the image capture unit, until it is determined that the light source does not exist in sampling cycles thereafter or until an amount of adjustment reaches a preset limit amount.

5. The monitoring system according to any one of claim 1, further comprising:
  a distance detector for calculating a distance in an actual space from the image to the object detected by the object detecting unit,
  wherein when the existence of the light source is determined, the distance detector calculates the distance based on positional information of the object which excludes positional information of the object on the side where the light source exists.

6. The monitoring system according to claim 1,
  wherein the object detecting unit detects a transverse traveling speed of the object based on a position change of the object in the actual space within a sampling cycle,
  wherein when the existence of the light source is determined, the object detecting unit detects the transverse traveling speed based on the positional information of the object which excludes the positional information of the object on the side of the object where the light source exists.

7. The monitoring system according to claim 1, wherein the computer comprises a central processing unit and a determination module in communication with said central processing unit, and wherein said determination module comprises each of said object detecting unit, said setting unit for monitoring range, said determining unit and said adjusting unit.

8. The monitoring system according to claim 1, wherein the computer comprises a memory, and the transverse width of the object is stored in the memory of said computer.

* * * * *